United States Patent [19]

Evans

[11] Patent Number: 4,781,509

[45] Date of Patent: Nov. 1, 1988

[54] STACK LOADER

[76] Inventor: Elferd L. Evans, 1235 W. I St., Oakdale, Calif. 95361

[21] Appl. No.: 130,625

[22] Filed: Dec. 9, 1987

[51] Int. Cl.<sup>4</sup> ............................................. B65H 1/30
[52] U.S. Cl. ................................ 414/52; 271/157; 294/67.22; 294/67.3; 414/112; 414/97
[58] Field of Search ............ 414/32, 48, 52, 97, 414/112, 115; 271/157; 294/67.2, 67.21, 67.22, 67.3

[56] References Cited

U.S. PATENT DOCUMENTS 2,757,035  7/1956  Buehler ........................ 294/67.2

FOREIGN PATENT DOCUMENTS 57-137232  8/1982  Japan ............................ 414/112
839786  6/1960  United Kingdom .............. 271/157

Primary Examiner—Leslie J. Paperner

[57] ABSTRACT

A stack loader (30), for picking up a stack (10) of thin metal sheets, moving the stack to a feed hopper (100) and lowering the stack into the feed hopper, is provided, the stack loader (30) having a fork support frame (31) and a stack retainer (32) telescopically received in the fork support frame, the stack retainer (32) being shaped to fit over the stack while leaving the back of the stack mostly exposed, the fork support frame (31) having lifting forks (41) mounted thereon which can fit under the stack (10) and lift it up into the stack retainer (32) so that sagging bottom sheets in the stack will not spill out of the stack loader (30) during movement of the stack (10) to the feed hopper (100). The forks (41) can be locked under the stack (10) and an automatic safety (92, 93) is provided to prevent unlocking of the forks during movement of the stack loader to the feed hopper.

16 Claims, 6 Drawing Sheets

STACK LOADER

This invention relates to stack loaders, and more particularly to apparatus for loading a stack of thin metal sheets into a feed hopper of a machine which operates on said sheets.

Although its use is not so restricted, the present invention was developed in connection with can manufacturing machines which press out a plurality of can ends from generally rectangular scroll strips of thing-auge sheet metal. Typically, such machines have inclined feed hoppers with inclined flat guide bias on which batches of scroll strips are placed on edge. The scroll strips slide broadside down the guide bars, by gravity, with the forwardmost scroll strip being removed automatically from the hopper and moved into the end press.

Also typically, pluralities of stacks of scroll strips, weighing in the order of 1000 pounds per stack, are delivered by fork lift trucks or the like and set down on tables in close vicinity to the end presses. A workman then loads the stacks of scroll strips by hand onto the inclined guide bars of the feed hopper of the end press.

The manual loading of a feed hopper is a time consuming and tiring operation since a typical end press will process a full 1000-pound stack of scroll strips in from forty-five minutes to an hour. In the loading process, the workman must take a batch of scroll strips from the top of a stack, carry it to the feed hopper and hold the heavy batch out away from his body to place the strips on the guide bars. The individual scroll strips are formed by shearing operations and have very sharp edges so that the workman must be continually alert in handling the strips. If the workman loads ten pounds of scroll strips at a time it will take one hundred handlings to move one full stack of scroll strips from the stacking table into the feed hopper. Injuries, particularly to hands, arms and backs are relatively common. Also, since the individual scroll strips can slip relative to each other during handling, considerable spoilage of scroll strips may occur during loading.

Although the disadvantages of manual loading are well recognized, nothing has been developed prior to the present invention to automate this operation. There are a number of factors which contribute to the difficulty of providing equipment for this purpose. Such equipment must be able to pick up a vertical stack of scroll strips, transfer the stack to the feed hopper and lay the stack down onto the inclined guide bars, while controlling the stack at all times against spillage. The problem is further complicated by the fact that the lower part of a stack of scroll strips will sag downwardly where the bottom of the stack is unsupported. As a consequence, if a stack of scroll strips is to be picked up with the bottom of the stack not fully supported, provision must be made to contain the sagging strips so that they do not slide out from under the stack during transport of the stack.

SUMMARY OF THE INVENTION

It is an object of the invention to provide a power-assisted stack loading apparatus that can pick up a full stack of scroll strips from a table and transfer the stack into an inclined feed hopper.

It is a further object to provide a stack loader that can pick up a stack of metal sheets from the bottom of the stack and which can provide for retention of sagging sheets.

A still further object is the provision of a power-assisted stack loader which will enable loading of a stack of metal sheets without any contact by the operator with the sheets in the stack.

Additional objects, advantages and novel features of the invention will be set forth in the description which follows, and in part will become apparent to those skilled in the art upon examination of the following, or may be learned by practice of the invention. The objects and advantages may be realized and attained by means of the instrumentalities and combinations pointed out in the appended claims.

To achieve the foregoing and other objects, and in accordance with the present invention, as described and broadly claimed herein, a stack loader is provided having a fork support frame, a stack retainer telescopically received in the fork support frame, the stack retainer having an open bottom and being shaped to fit down closely onto a stack of metal sheets, the stack retainer having walls which surround said stack while leaving the back end of the stack mostly exposed, the fork support frame having a fork means with a lifting surface, the fork means being pivoted on the fork support frame for movement between first and second positions wherein the lifting surface is under, or out from under, a stack in the stack retainer, the stack retainer being movable relative to the fork support frame so that the bottom of the stack retainer walls can move from above the fork means lifting surface to below such surface, and lock means for locking the fork means from moving from its first, stack supporting, position while allowing the stack retainer to move up and down relative to the fork means.

BRIEF DESCRIPTION OF THE DRAWINGS

The accompanying drawings, which are incorporated in and from part of the application, together with the description, serve to explain the principles of the invention.

DESCRIPTION OF THE PREFERRED EMBODIMENT

Figure 1:
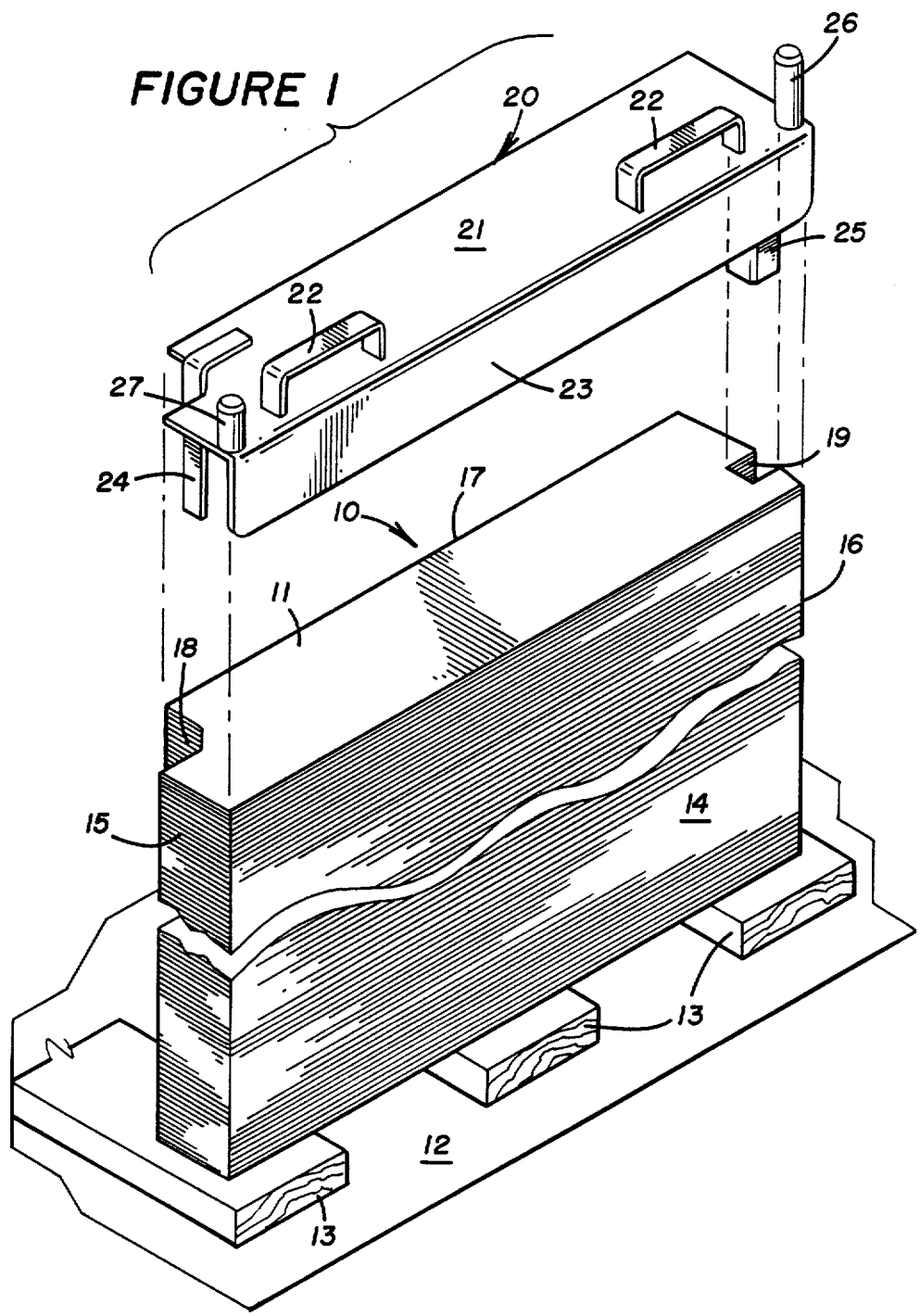
FIG. 1 is a perspective view of a stack of thin sheet metal scroll sheets, and of a cap made in accordance with the present invention for protection of the stack.

Referring now to the drawings, wherein a preferred embodiment of the invention is illustrated, FIG. 1 shows a stack 10 of thin sheet metal scroll strips 11 as they would be deposited on table 12 in the vicinity of the end press (not shown) in which the scroll strips will be processed. For the purposes of the present invention, the stack 10 will be supported above the surface of table 12 by blocks 13 or the like. The stack of scroll strips has a vertical front surface 14, end surfaces 15 and 16 and a back surface 17. Typically there will be a plurality of stacks 10 of scroll strips delivered to table 12 at one time, with the other stacks extending rearwardly of the illustrated stack. The individual scroll strips 11 are shaped in accordance with the particular end press in which they are to be processed. Generally, they are rectangular in shape with locating notches 18 and 19 at either end thereof.

FIG. 1 also shows a cap 20 used in the present invention to protect the uppermost sheets in the stack against damage. Cap 20 has a top flat plate 21 generally of the same shape as that of the scroll sheets 11 and with handles 22 on its upper surface. The cap 20 has a front depending skirt 23 adapted to fit flush against the upper part of the front surface 14 of the stack 10, and depending members 24 and 25 adapted to fit into the notches 18 and 19. When the cap 20 is fitted onto the top of a stack 10, the depending skirt 16 and members 24 and 25 prevent lateral movement of the cap relative to the stack so that the cap stays in place to protect the stack. The cap 20 also has upstanding guide posts 26 and 27 at the front ends of the top plate 21.

Figure 2:
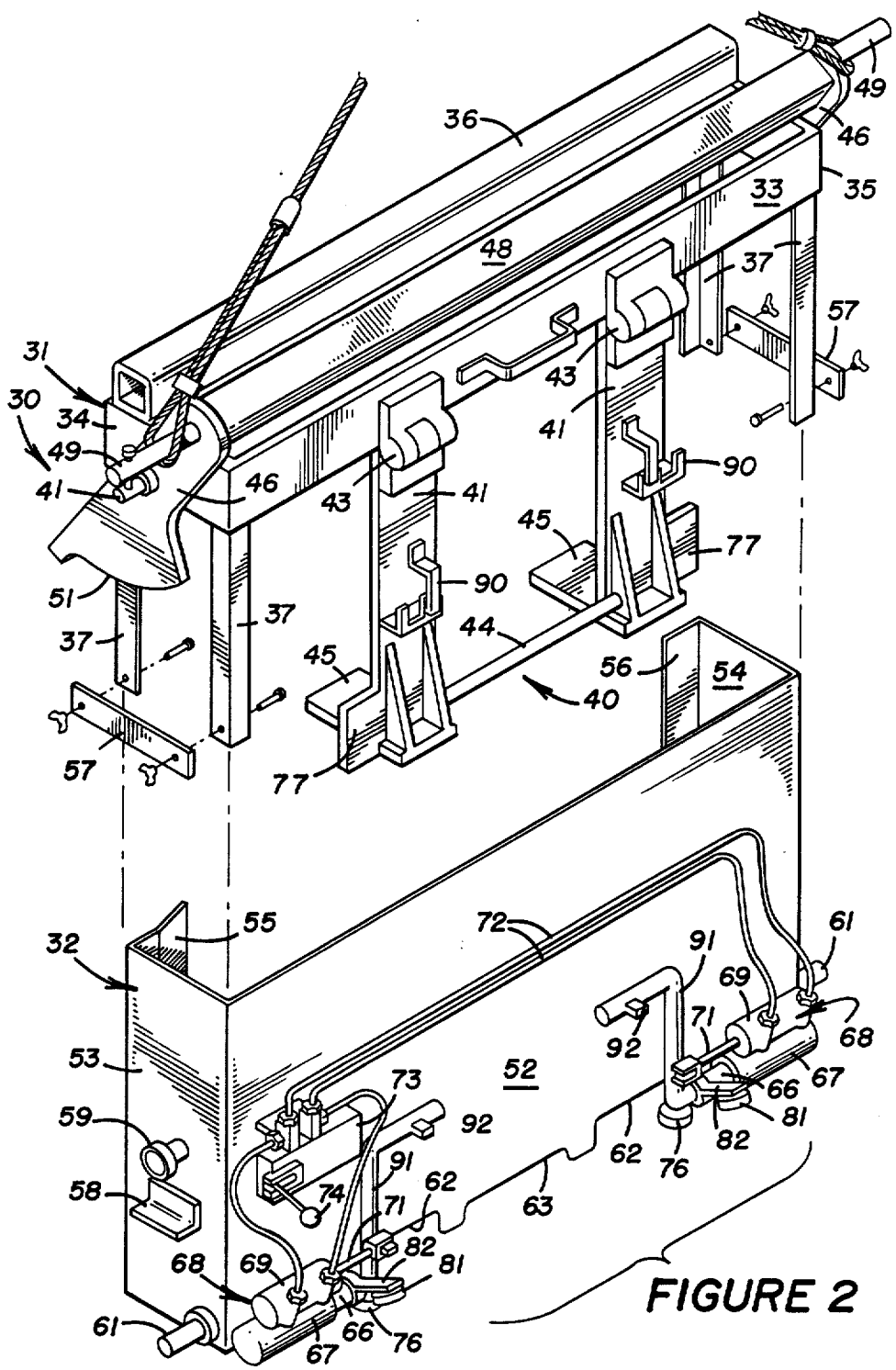
FIG. 2 is a partially exploded perspective view of a stack loader made in accordance with the present invention.

The stack loader 30 of the present invention is shown in partially exploded form in FIG. 2 and comprises two main components, the fork support frame 31 and the stack retainer 32 which is telescopically received in the fork support frame. The fork support frame 31 is generally rectangular in shape and has a front wall 33, two end walls 34 and 35 and an open back. A tubular brace 36 extends between the upper rear ends of the end walls to rigidify the frame. The fork support frame 31 also includes depending angle iron legs 37 at the corners thereof to fit against the corners of the stack retainer 32. A fork means 40, comprising two forks 41, is carried by the fork support frame, each fork being pivotally connected by hinges 43 to the front wall 33. The forks are connected together by tube 44 which serves as a handle whereby an operator can pivot the forks in unison. The forks 41 are L-shaped and terminate in an upwardly facing lifting surface 45.

The fork support frame 31 also includes a lifting lever 46 at each end thereof, the levers 46 being pivoted at 47 to the end walls 34 and 35. A support tube 48 extends between the upper ends of the lifting levers and rods 49 extend outwardly from the lifting levers for attachment of the lifting levers to an overhead hoist (not shown). The support tube 48 is preferably non-circular at its ends where connected to the lifting levers so that the support tube cannot twist relative to the lifting levers, to ensure that the degree of pivotal movement of the lifting levers 46 about their pivot points 47 will be the same at each end of the fork support frame. The lower portions of the lifting levers have a downwardly facing cam surface 51.

The stack retainer 32 has an open bottom, a front wall 52, end walls 53 and 54 and back wall portions 55 and 56, the back wall portions extending from the end walls towards each other but terminating at a substantial distance from each other so as to expose most of the rear surface 17 of a stack 10 in the stack retainer. The stack retainer 32 is designed for the particular scroll sheets with which it will be used, and is shaped to fit down closely onto a stack of such sheets.

In assembling the stack loader 30, the fork support frame 31 is telescoped downwardly onto the stack retainer 32, with such downward movement being limited by the engagement of the end walls 53 and 54 of the stack retainer with the support tube 36 of the fork support frame. At such time, the cross pieces 57 are secured to the depending angle iron legs 37 of the fork support frame, at a location below the end wall brackets 58 of the stack retainer. The end walls 53 and 54 of the stack retainer 32 each also have a cam follower roller 59 mounted thereon for engagement with the cam surfaces 51 of the lifting levers 46. Also mounted near the bottoms of the end walls 53 and 54 of the stack retainer are outwardly projecting guide rods 61. The bottom of the front wall 52 of the stack retainer 32 is notched at 62 to allow the forks 41 to move upwardly above the bottoms of the end walls, and is centrally notched at 63 for an unloading purpose to be disclosed later herein.

Figure 3:
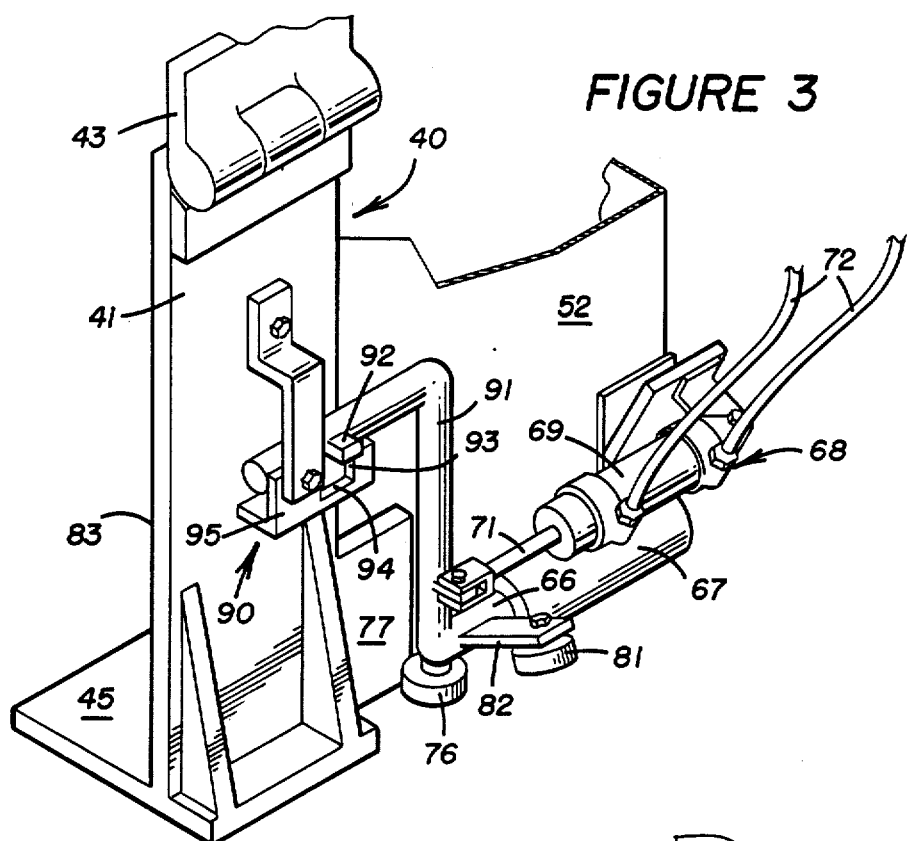
FIG. 3 is a perspective view of a portion of the stack loader of FIG. 2 to illustrate the details of the lock means and safety means for the lifting forks.

As shown in FIGS. 2 and 3, the stack retainer 32 has a two lock carriers 66 mounted thereon for movement relative to the stack retainer. In the present embodiment, the lock carriers are in the form of rods mounted for axial movement in fixed sleeves 67 for movement parallel to the front wall 52 of the stack retainer and towards and away from the fork 41 with which each rod 66 is associated. Fluid actuated rams 68, each having a fixed housing 69 and a piston 71 connected to one of the rods 66, are provided for moving the rods axially. These rams are fluidly connected by pressure lines 72 to a control box 73 and from there, by a pressure line (not shown) to a suitable source of pressure fluid. Manual control lever 74 is provided to enable the operator to move the ram pistons in unison, so that the rods 66 are both moved in unison towards the forks with which they are associated, or both moved away therefrom, depending on the position of lever 74.

The rods 66 each carry a lock member 76, shown here as a rotatable cam roller, which is engageable with a vertically extending lock surface 77 of the associated fork 41 when the rods 66 are moved towards the forks and the forks are in their first position, i.e., with their lifting surfaces 45 under the open bottom of the stack retainer 32.

The rods 66 also each carry a holding member 81, shown here also as a rotatable cam roller, mounted in outwardly extending bracket 82, which is engageable with a vertically extending holding surface 83 on the associated fork 41 when the rods 66 are moved towards the forks and the forks are in their second position, i.e., with their lifting surfaces 45 completely out from under the open bottom of the stack retainer 32.

The stack loader 30 further includes a safety means 90 for preventing unlocking of the forks 41 when the stack retainer is in its second, or lowermost, position relative to the fork support frame. Such safety means includes an L-shaped extension 91 on each rod 66 which extends upwardly and then towards the center of the stack loader, the extension having a first safety member in the form of a lug 92 thereon, the lug being engageable with a second safety member, shown herein as the upwardly extending surface 93 of notch 94 in the bracket 95 fixed to each fork 41.

FIGS. 4-9 illustrate the sequence of operation of the elements thus far described. As mentioned previously, the cap 20 will first be placed on top of the next stack 10 of scroll strips to be handled. The stack loader 30, suspended from an overhead crane or hoist (not shown) will be moved by the operator to a position above the stack. With the forks held by the holding rollers 76 out from under the stack retainer 32, the stack loader is lowered onto the stack. The upstanding guide posts 26 and 27, on cap 20, one of which is longer than the other, extend up into the front corners of the stack retainer 32 and enable the operator to guide the stack loader onto the stack. The stack loader is then lowered all the way onto the stack, so that the bottoms of the stack retainer walls come to rest on the wooden supports 13. Continued lowering of the stack loader will allow the lifting levers 46 to pivot away from vertical, which in turn allows the fork support frame 31 and forks 41 to move downwardly to the position shown in FIG. 4. At this time the operator will actuate the control lever 74 so that the rods 66 are moved axially away from the forks, thus moving the holding rollers 81 out of holding engagement with the forks. The operator may now pivot the forks to their first position, FIG. 5, with their lifting surfaces 45 under the stack in the stack retainer 32.

The operator now operates the control lever 74 to move the rods 66 back towards the center of the stack loader so that the lock rollers 76 now engage the lock surfaces 77 on the forks. Such engagement locks the forks against movement from their first positions under the stack.

The operator now actuates the hoist to provide a lifting force on the lifting levers. The lifting force gradually lifts the fork support frame and forks so that the forks engage the under surface of stack 10 and move it up off of the wooden blocks 13. At the same time, as the lifting levers move to their vertical position, the cam surfaces 51 on the lifting levers will engage the cam follower rollers 59 on the stack retainer so that the stack retainer is held against vertical movement with the fork support frame. The elements will now be in the positions shown in FIG. 6. The locking surfaces 77 on the forks have a considerable vertical extent so that the locking rollers 76 continue to engage the locking surfaces 77 and thereby lock the forks during the relative movement of the stack retainer and the fork support frame.

Figure 7:
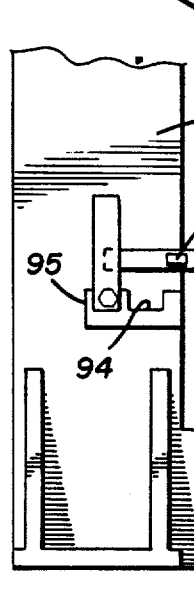
FIGS. 7-9 are simplified sequential front elevational views of the locking means and safety mechanism at different stages in a lifting operation.
Figure 5:
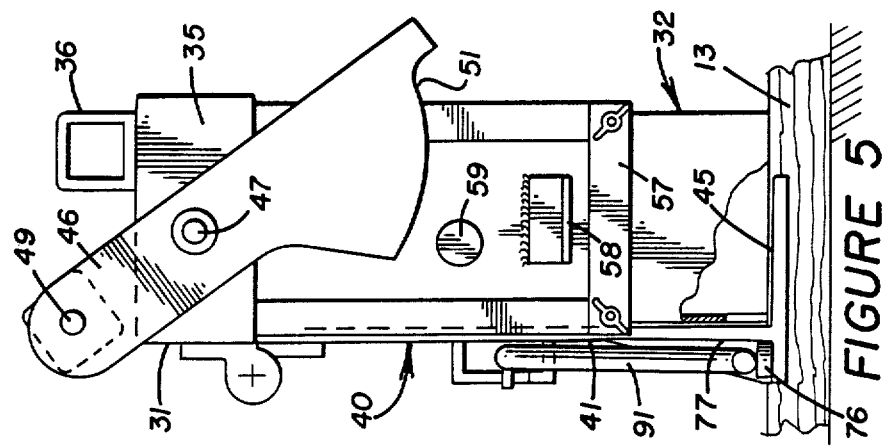
Figure 4:
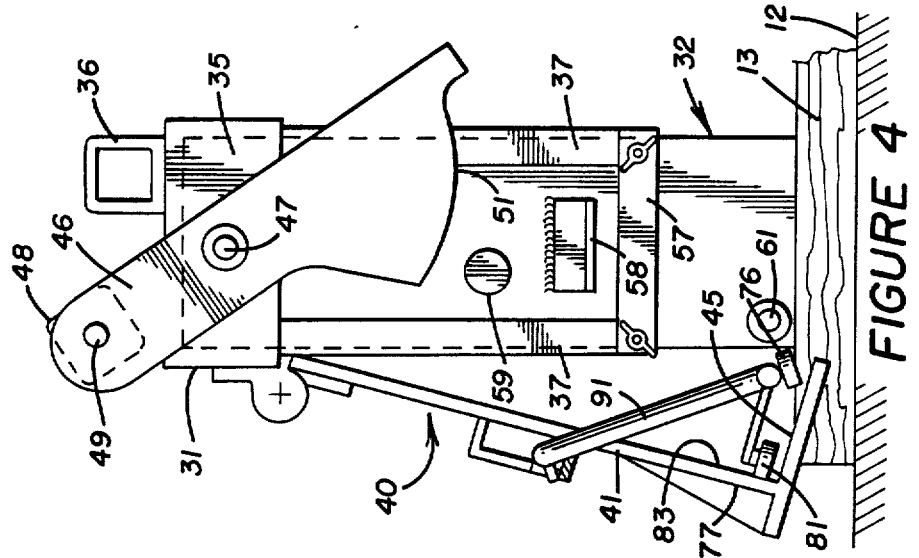
Figure 10:
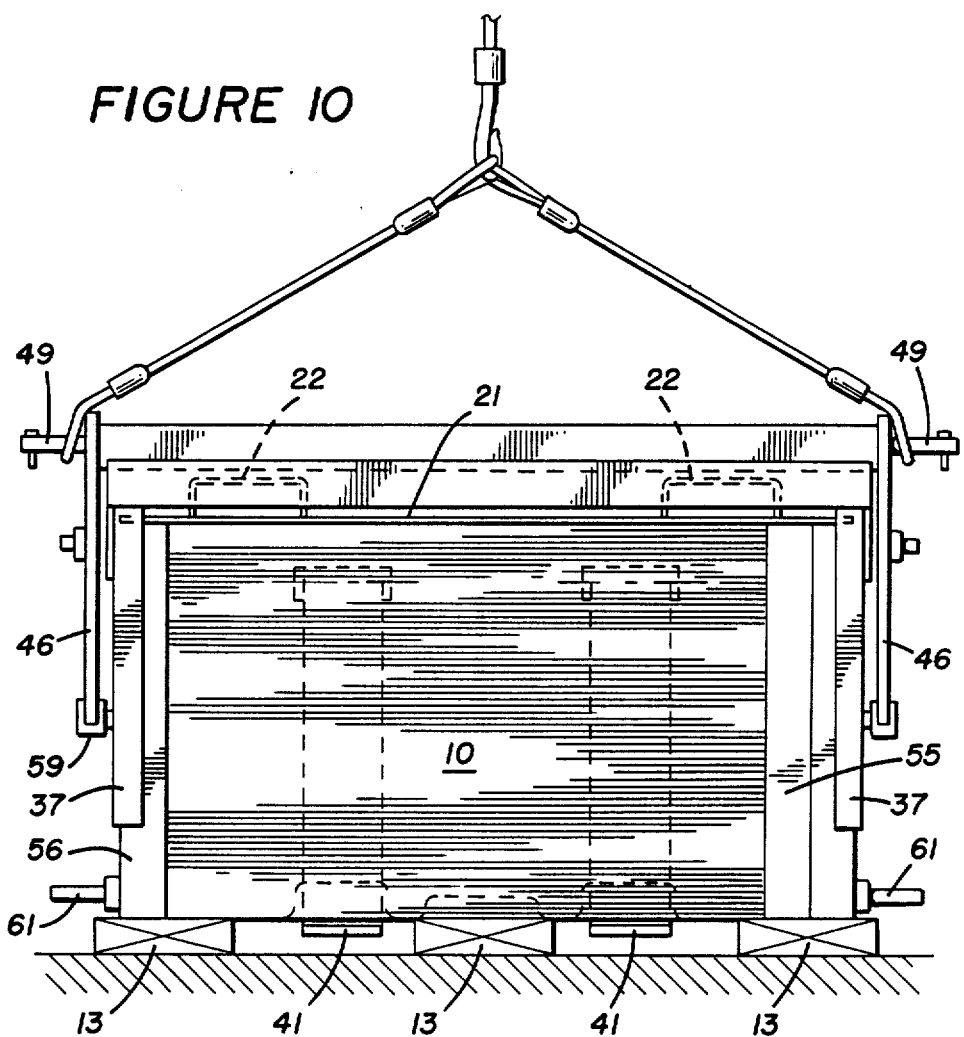
FIG. 10 is a rear elevational view of the stack loader of FIG. 2 with a stack of scroll sheets within the loader, and the forks below the stack.
Figure 11:
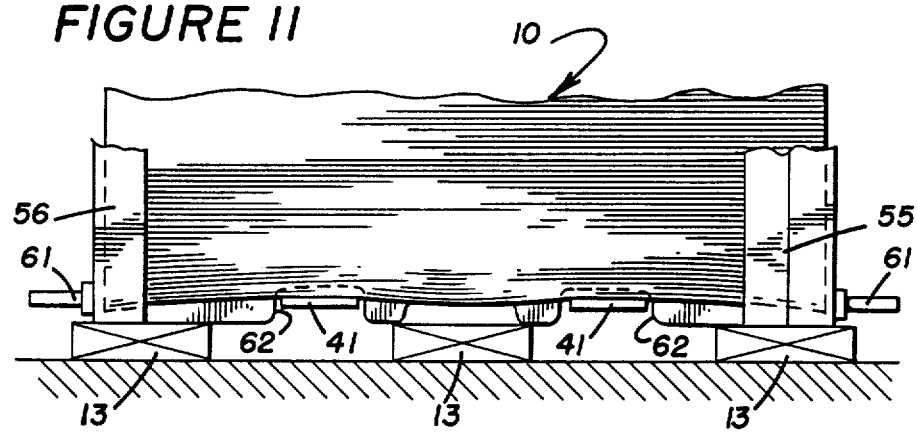
FIG. 11 is a partial back elevational view of the stack loader, illustrating the scroll sheets being supported by the lifting forks.

FIGS. 10 and 11 are rear views of the stack loader in the positions corresponding to FIGS. 5 and 7. As is shown in FIG. 11, with the forks 41 supporting the stack 10 from underneath, the unsupported ends of the lower scroll sheets will sag downwardly. However, since the stack retainer 32 has, in effect, moved downwardly relatively to the stack 10 as it is lifted by the forks, the bottoms of the end walls of the stack retainer 32 and the front and back wall portions thereof adjacent to the end walls are all substantially below the lifting surfaces 45 of the forks and are thus below the sagging ends of the scroll strips so that the scroll strips cannot spill from the stack loader during the rest of the feed hopper loading operations.

Figure 6:
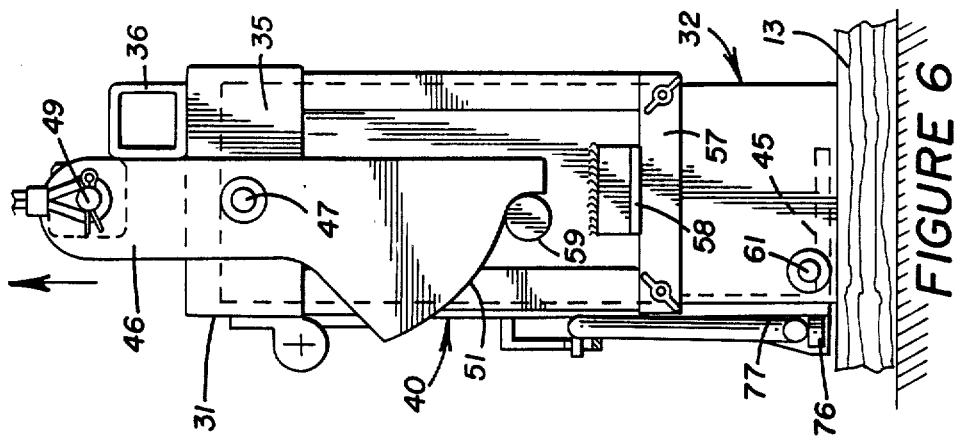
FIGS. 4–6 are simplified sequential side elevational views of the stack loader of FIG. 2 at different stages in a lifting operation.

During upward movement of the fork support frame, from the position of FIG. 5 to that of FIG. 6, if the forks were not locked against movement from their second position, or if they should accidentally be unlocked, the weight of the scroll strip stack 10 will simply cam the forks outwardly from engagement with the stack.

Figure 8:
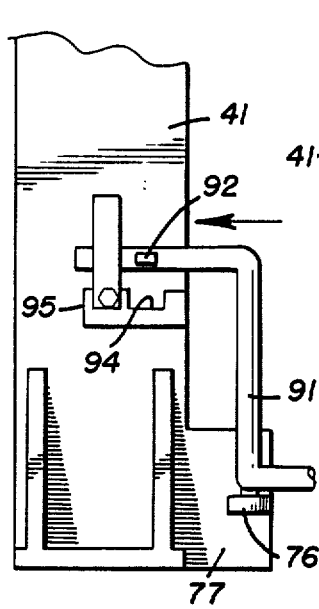
Figure 9:
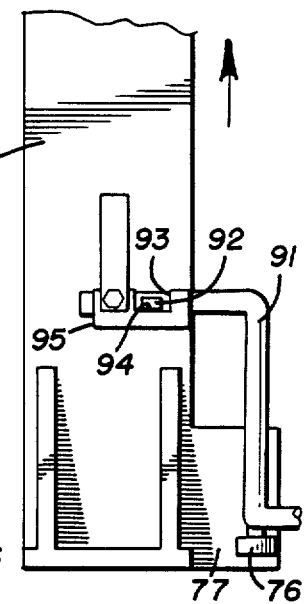

However, when the stack is now lifted from table 12 it becomes important to guard against accidental unlocking of the forks. The operation of the safety means 90 is illustrated in FIGS. 7-9. FIG. 7 illustrates the position of fork 41 when it is underneath the bottom of the stack retainer (i.e., as shown in FIG. 6) and before it is locked in place. When locking occurs, the rod 66 will move to the left so that lock roller 76 engages the lock surface 77 on fork 41. At the same time, the L-shaped extension 91 on rod 66 will move to the left so that the lug 92 is positioned above notch 94 in bracket 95 on fork 41, as shown in FIG. 8. Then, when a lifting force is applied to the lifting levers 46 on the fork support frame, and the forks 41 move upwardly relative to the stack retainer 32 (i.e., shown in FIG. 6), the fork bracket 95 will move upwardly relative to the rod extension 91 so that lug 92 moves into notch 94, as shown in FIG. 9. The engagement of lug 92 with the vertical wall 93 of notch 94 will thus prevent unlocking movement of rod 66 to the right, in case the operator should accidentally hit the control lever 74.

The operator can now continue to actuate the hoist so that the stack loader 30 and the scroll strip stack 10 are lifted completely from table 12. The cross pieces 57 on the fork support frame 31 engage the end brackets 58 on the stack retainer 32 so that the stack retainer 32 will be lifted with the fork support frame while in its second position relative thereto.

Figure 12:
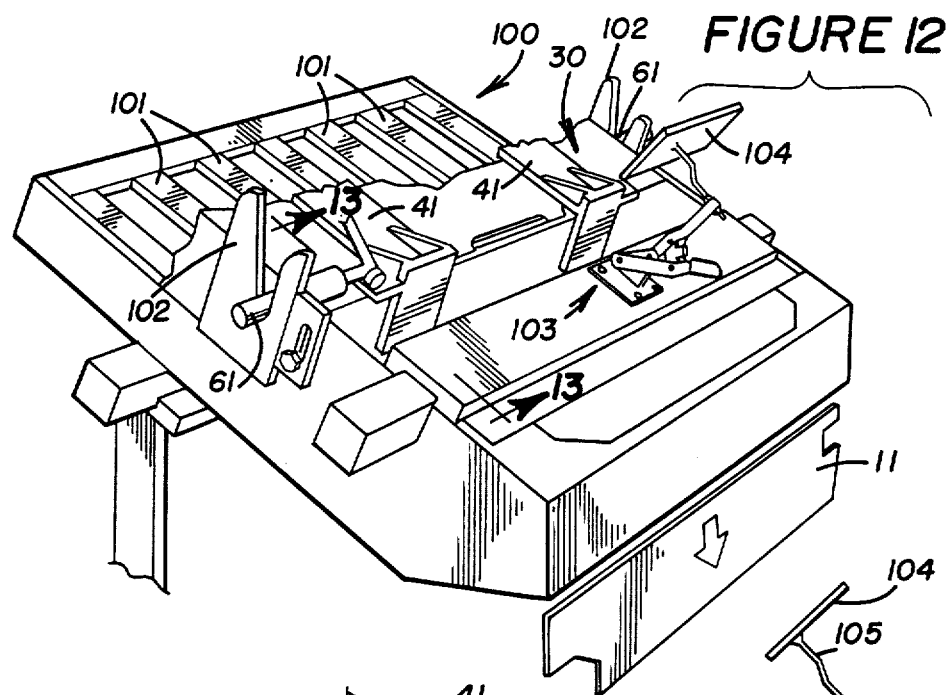
FIG. 12 is a perspective view of a feed hopper with the stack loader lowered into the hopper, with portions of the stack loader being omitted for ease of illustration.

The hoisted stack loader is now moved over to the feed hopper 100 (FIG. 12) of the end press. The feed hopper 100 is conventional, and includes inclined guide bars 101 onto which the scroll strips are placed on edge. The stack of scroll strips in the feed hopper will slide, by gravity down the guide bars 101, with the forward-most strip being repeatedly removed from the hopper and fed to the end press. For purposes of the present invention, the feed hopper is modified by the addition of two upstanding V-guides 102 on opposite sides of the feed hopper and a stripper means 103.

The stack loader 30 is now lowered and guided so that the rods 61 on the stack retainer 32 enter the V-guides 102 and come to rest in the bottoms of these guides. The operator then continues lowering the stack loader. Since the lifting lever pivot 47 on the fork support frame 31 and the guide rods 61 on the stack retainer 32 are all forward of the center of gravity of the loaded stack loader, continued lowering of the hoist will cause the stack loader to automatically lie down in the feed hopper until it comes to rest with the back surface of the scroll strip stack resting on the guide bars 101 of the feed hopper. With the lifting force released, and the stack retainer 32 being held against movement by the engagement of its guide rods 61 in the V-guides 102, the scroll strip stack will slide by gravity down the guide bars, carrying the locked forks therewith to the first relative position of the fork support frame and stack retainer 32. Such movement will also move the fork brackets 95 down so that the safety lugs 92 move the fork brackets notches 94.

Figure 13:
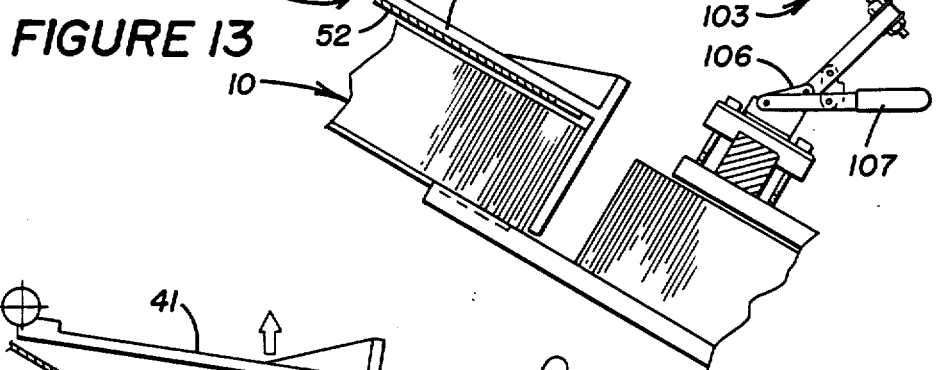
FIG. 13 is a partial sectional view of the stack loader and feed hopper taken on line 13—13 of FIG. 12, showing the stripper plate in a first position.
Figure 14:
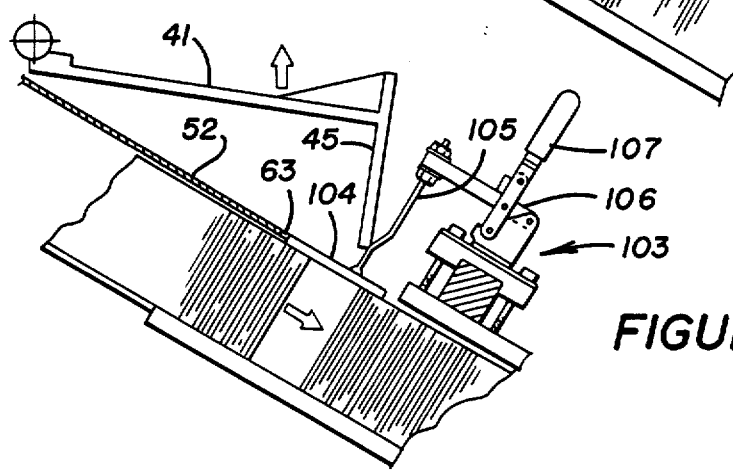
FIG. 14 is a view similar to FIG. 13, showing the stripper plate in a second position.

The stripper means 103 is best shown in FIGS. 13 and 14, and comprises a flat stripper plate 104 mounted by a stiff spring member 105 to an over-center mechanism 106. Actuation of the toggle 107 will move the stripper plate either to an out-of-the-way position (FIG. 13) or an operative position (FIG. 14). During the lowering of the stack loader 30 into the feed hopper, the stripper plate 104 is in its out-of-the-way positions. After the stack loader has been fully lowered in the feed hopper, the operator moves toggle 107 to lower the stripper plate 104 down onto the upper surface of the scroll strip stack, with the stripper plate being locked in place by an over-center action. The stripper plate 104 extends up into the central notch 63 in the front wall 52 of the stack retainer 32 so that it engages a considerable number of scroll strips above the forks 41.

The operator can now actuate the control lever 74 so that the rams 69 move the rods 66 and lock rollers 76 to unlock the forks 41. The weight of the scroll strip stack 10 will cause the stack to slide down the guide bars 101 and cam the unlocked forks to open position. As the forks move to open position, there is a tendency for the forwardmost strip to be pulled upwardly with the forks because of the grabbing effect of the shape edge of that strip with the lifting surfaces of the forks. This in turn could pull the next several scroll strips upwardly as well. However, with the stripper plate 104 in position, the stripper plate will hold the scroll strips down and strip them from the forks as the forks are cammed upwardly. The scroll strip stack is now free to slide down the guide bars and come to rest against the scroll strips still remaining in the hopper from the previous loading of the hopper. To maintain the forks 41 out of the way, after they are raised, the operator then actuates control lever 74 so that the rods 66 are again moved axially towards the forks. Such movement will now cause the holding rollers 81 to engage the holding surfaces 83 on the forks so that the forks are supported against movement towards the stack retainer 32.

In due course, the stack of scroll strips will move down the guide bars 101 until the last scroll strip of the stack has moved past the forks 41. At such time, the stripper plate 104 is moved out of the way, and the stack loader 30 is hoisted from the feed hopper and moved back to table 12 to pick up the next stack of scroll strips.

It will take in the order of two or three minutes for an operator to hoist the stack loader 30 from the feed hopper, pick up another scroll strip stack and load it into the feed hopper. Since a single stack will last in the feed hopper from forty-five minutes to an hour during operation of the end press, the operator will then have a considerable amount of uninterrupted time before the next loading in which to perform other duties.

The foregoing description of the preferred embodiment has been presented for purposes of illustration and description. It is not intended to be exhaustive or to limit the invention to the precise form described, and obviously many other modifications are possible in light of the above teaching. The embodiment was chosen in order to explain most clearly the principles of the invention and its practical applications thereby to enable others in the art to utilize most effectively the invention in various other embodiments and with various other modifications as may be suited to the particular use contemplated. It is intended that the scope of the invention be defined by the claims appended hereto.

I claim:

1. A stack loader for moving a stack of metal sheets, said sheets being generally rectangular and said stack having vertical front, ends and back surfaces, said stack loader comprising:
   a fork support frame,
   a stack retainer telescopically received in said fork support frame and having an open bottom, a front wall, two end walls and relatively short-widthed back wall portions extending from said end walls towards each other but terminating at a substantial distance from each other, said stack retainer being shaped to fit down closely onto said stack of metal sheets,
   fork means having a lifting surface and hinged to said fork support frame adjacent the front wall of said stack retainer, said fork means being pivotally movable between first and second positions wherein said lifting surface is under, and out from under, respectively, said open bottom of said stack retainer,
   said stack retainer being movable relative to said fork support frame between first and second positions wherein the bottoms of said end walls of said stack retainer and of the front and back wall portions adjacent to said end walls are above, and substantially below, respectively, said lifting surface of said fork means,
   lock means for locking said fork means from moving from its first position while allowing said stack retainer to move between its first and second positions relative to said fork support frame.

2. A stack loader as set forth in claim 1, wherein said lock means includes a lock carrier mounted on said stack retainer for movement relative thereto, said lock carrier having a lock member movable therewith and engageable with a lock surface on said fork means, said lock carrier being movable between first and second positions wherein said lock member is out of, or in, engagement, respectively, with said lock surface on said lock means when said fork means is in its first position.

3. A stack loader as set forth in claim 2, wherein said lock carrier is a rod mounted on said stack retainer parallel to the front wall of said stack retainer and for axial movement towards and away from said fork means.

4. A stack loader as set forth in claim 2, wherein said lock carrier has a holding member thereon engageable with a holding surface on said fork means, said holding member being out of, or in, engagement with said holding surface on said fork means when said lock carrier is in its first or second positions, respectively, and when said fork means is in its second position.

5. A stack loader as set forth in claim 2, and further including a safety means for preventing unlocking of said fork means during the time said stack retainer is in its second position relative to said fork support frame.

6. A stack loader as set forth in claim 5, wherein said safety means includes a first safety member movable with said lock carrier and a second safety member mounted for movement with said fork means, said first and second safety members being engageable with each other upon movement of said stack retainer from its first to its second position relative to said fork support frame, said safety members acting to prevent movement of said lock carrier from its second position when said first and second safety members are engaged.

7. A stack loader as set forth in claim 2, and further including manually-controllable air-pressure actuated means for moving said lock carrier between its first and second positions.

8. A stack loader as set forth in claim 7, and further including a safety means for preventing unlocking of said fork means during the time said stack retainer is in its second position relative to said fork support frame.

9. A stack loader as set forth in claim 8, wherein said safety means includes a first safety member movable with said lock carrier and a second safety member mounted for movement with said fork means, said first and second safety members being engageable with each other upon movement of said stack retainer from its first to its second position relative to said fork support frame, said safety members acting to prevent movement of said lock carrier from its second position when said first and second safety members are engaged.

10. A stack loader as set forth in claim 2, and further including forcing means for forcing said stack retainer from its first to its second position in response to lifting movement of said fork support frame.

11. A stack loader as set forth in claim 10, and further including a safety means for preventing unlocking of said fork means during the time said stack retainer is in its second position relative to said fork support frame.

12. A stack loader as set forth in claim 1, and further including forcing means for forcing said stack retainer from its first to its second position in response to lifting movement of said fork support frame.

13. A stack loader as set forth in claim 12, wherein said forcing means includes a pair of lifting levers pivotally mounted on an end of said fork support frame, said lever having a cam surface thereon, and a cam follower mounted on an end of said stack retainer for engagement by said cam surface.

14. A stack loader as set forth in claim 13, said stack loader being usable with an inclined feed hopper having V-guides mounted thereon, said stack loader further including a guide rod projecting from each end of said stack retainer for engagement with said V-guides.

15. A stack loader as set forth in claim 1, and further including,
manually-controllable air-pressure actuated means for moving said lock carrier between its first and second positions, and
safety means for preventing said manuallycontrollable air-pressure actuated means from unlocking said fork means during the time said stack retainer is in its second position relative to said fork support frame.

16. A stack loader as set forth in claim 15, wherein said safety means includes a first safety member movable with said lock carrier and a second safety member mounted for movement with said fork means, said first and second safety members being engageable with each other upon movement of said stack retainer from its first to its second position relative to said fork support frame, said safety members acting to prevent movement of said lock carrier from its second position when said first and second safety members are engaged.

* * * * *